E. FLETCHER.
ADVERTISING DEVICE.
APPLICATION FILED JUNE 16, 1911.
1,050,936.
Patented Jan. 21, 1913.
3 SHEETS—SHEET 3.
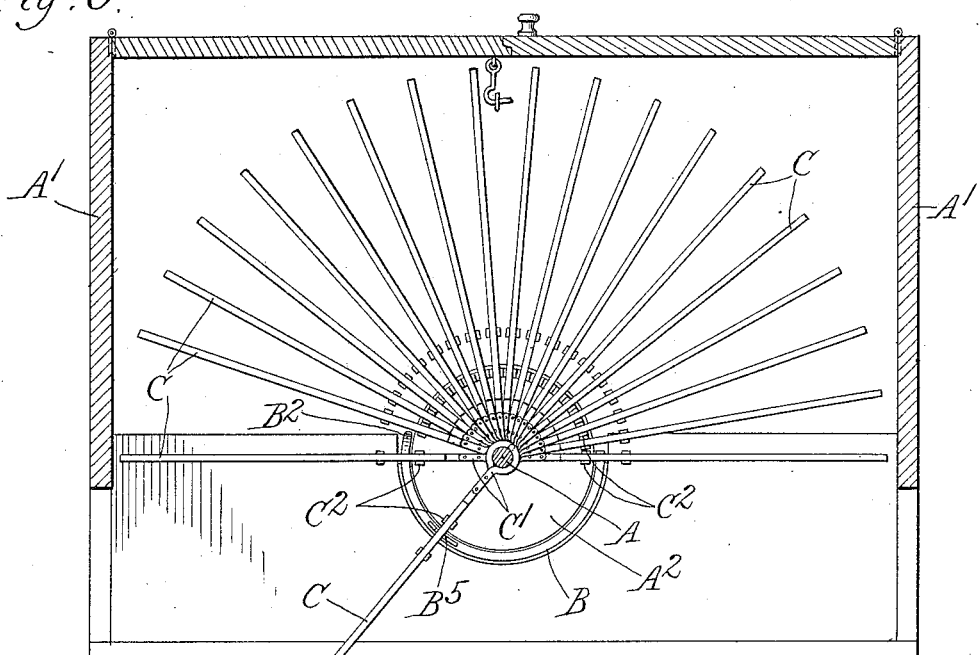
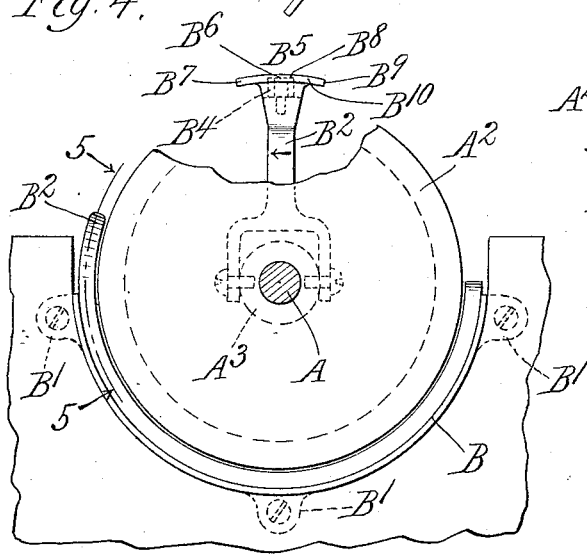
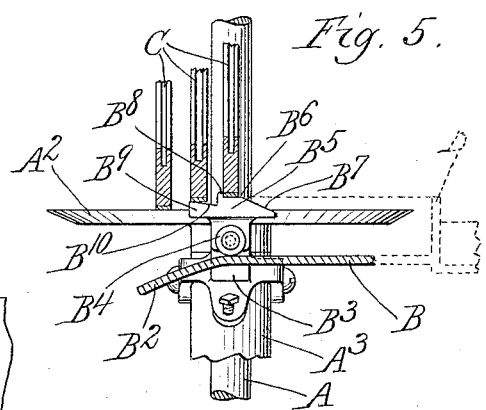
Witnesses,
Edward T. Wray.
Inventor,
Elmer Fletcher,
by Parker & Carter
Attorneys.

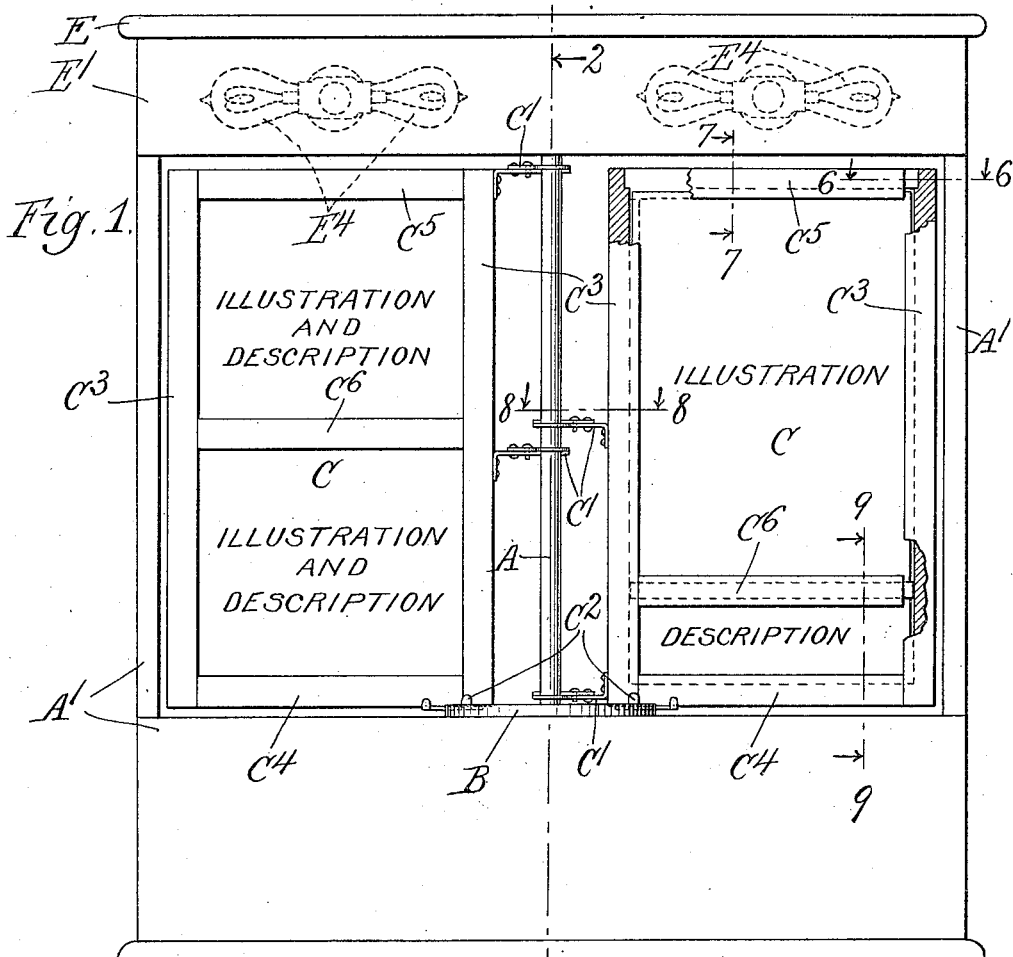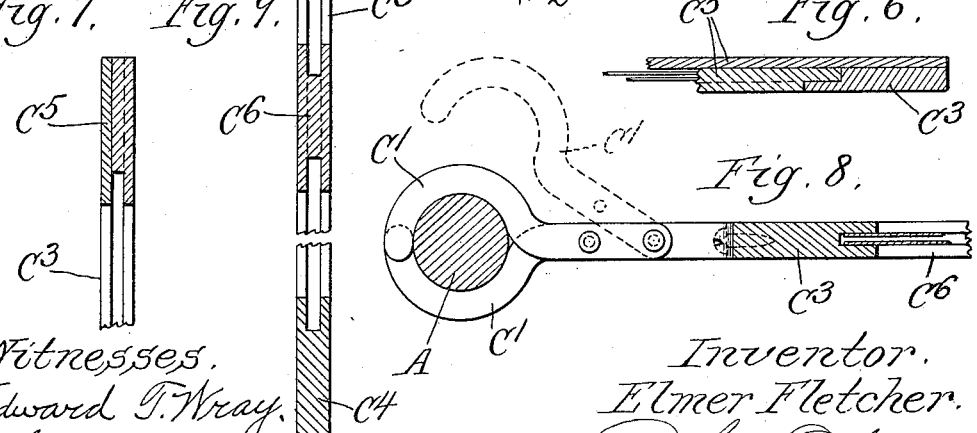

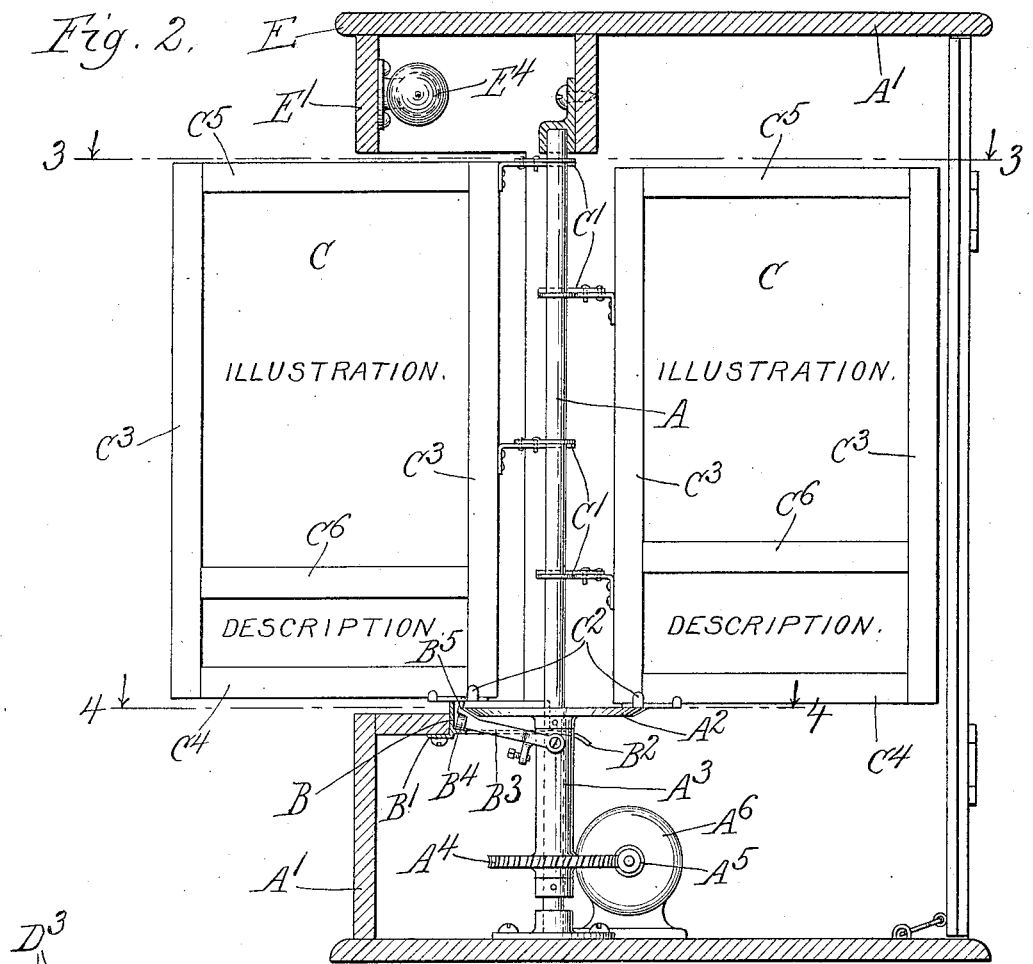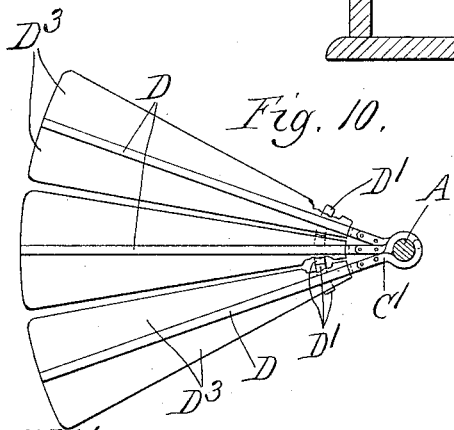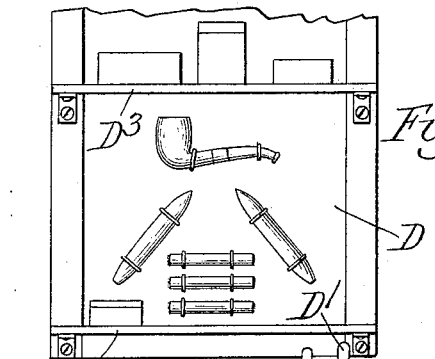

UNITED STATES PATENT OFFICE.

ELMER FLETCHER, OF CHICAGO, ILLINOIS, ASSIGNOR TO MATHEW P. RAE, OF CHICAGO, ILLINOIS.

ADVERTISING DEVICE.

1,050,936.   Specification of Letters Patent.   Patented Jan. 21, 1913.

Application filed June 16, 1911. Serial No. 633,484.

*To all whom it may concern:*

Be it known that I, ELMER FLETCHER, a citizen of the United States, residing at Chicago, in the county of Cook and State of Illinois, have invented a certain new and useful Improvement in Advertising Devices, of which the following is a specification.

My invention relates to improvements in advertising devices and is illustrated diagrammatically in one form in the accompanying drawings wherein—

Figure 1 is the front elevation of the parts in section. Fig. 2 is a section on the line 2—2 of Fig. 1. Fig. 3 is a section on the line 3—3 of Fig. 2. Fig. 4 is a section on the line 4—4 of Fig. 2. Fig. 5 is a section on the line 5—5 of Fig. 4. Fig. 6 is a section on the line 6—6 of Fig. 1. Fig. 7 is a section on the line 7—7 of Fig. 1. Fig. 8 is a section on the line 8—8 of Fig. 1. Fig. 9 is a section on the line 9—9 of Fig. 1. Fig. 10 is a detailed plan view of a modified form of panel. Fig. 11 is a detailed elevation of a modified form of panel.

Like parts are indicated by like characters in all the drawings.

The shaft $A$, which is held in vertical position in the casing $A^1$, carries the fixed disk $A^2$ overhanging the rotatable sleeve $A^3$, upon which sleeve is rigidly mounted worm wheel $A^4$, in engagement with the worm $A^5$ driven by the motor $A^6$. The circular L-shaped ring or track $B$, which projects beneath the surface of the disk $A^2$, is rigidly mounted by means of the lugs $B^1$ upon the casing $A$ and extends concentric with and slightly removed from the disk $A^2$ through an arc approximately 180 degrees, and is provided at one end with the downwardly inclined cam extension $B^2$ projecting from the base of the L. The arm $B^3$, which is pivotally mounted upon the sleeve $A^3$, is provided at its outer end with the roller $B^4$ in opposition to the base of the track $B$ and with the upwardly extending shoe $B^5$ supported thereby. The shoe $B^5$ is provided with the horizontally disposed bearing surface $B^6$ terminating at one end in downwardly extending cam surface $B^7$ and at the other end in upwardly extending lug $B^8$. The lug $B^9$, having the downwardly and forwardly inclined surface $B^{10}$, projects rearwardly from the shoe $B^5$ adjacent to the lug $B^8$ and underlies one of the panels C at the moment that it commences to ride up from the surface $B^7$.

The vertically disposed panels C, which rest at one end upon the plate or disk $A^2$, are provided near each end on one side with the split hook $C^1$ adapted to removably engage the shaft A, and have on their bottom edges near said lugs the spacing lugs $C^2$ in opposition one with the other. The panels C are made up of grooved or slotted side pieces $C^3$ and bottom $C^4$ and top $C^5$, adapted to contain cards bearing advertising or other matter, which are held in position and which may be divided into separate spaces by means of the strips $C^6$ slidably mounted in the slots.

In the modified form indicated in Figs. 10 and 11 I have shown a small number of panels D, which panels, however, are provided with the wider more extended lugs $D^1$ and the horizontally disposed shelves $D^3$ projecting vertically from the face of the panel for the reception of display objects.

The casing top E, which is provided along its front with the downwardly extending ledge or cornice $E^1$, contains the electric or other suitable lighting medium $E^4$ for the illumination of my device.

It will be evident that while I have indicated in my drawings an operative device still many changes might be made both in size, shape and arranging of parts without departing from the spirit of my invention. I wish, therefore, that my drawing may be regarded as in no sense diagrammatic.

The use and operation of my invention are as follows: The rotatable panels which are provided on either side with display signs or objects or pictures, as the case may be, are all rotatably mounted about the central shaft and may be removed therefrom one at a time without disturbing the remainder by opening the double hooks surrounding the shaft and thus freeing it therefrom. The disk or plate carried by the shaft normally supports the lower edges of all the panels and the panels are normally held in position thereon by the two opposed edges of the semi-circular ring or track, being spaced one from the other by the spacing lugs projecting from their opposed sides adjacent their holding hooks. When it is desired to use the panels merely for supports for illustrations or announcements the spacing lugs will be made very thin and a large number of panels may thus be packed into the device. When, however, it is desired to use the panels as supports for display objects the spacing lugs will be made relatively thicker and a smaller number of panels will then be used, the panels being provided with shelves, hooks or other attaching means for supporting the display objects. When the device is to be used it is desired to periodically rotate the panels thus exposing successive announcements on different sides thereof. This is done by means of the rotating sleeve which is driven by the motor at a constant speed and carries, by means of the radial arm, a shoe or carriage having a cam surface which contacts the lower edge of a panel adjacent the end of the track and carries it around until it drops off at the other end. This is done by means of the horizontally disposed base of the L shaped track, which base is provided with a downwardly extending cam portion to engage the roller supporting the shoe. As the roller rides up on the cam portion it raises the shoe bringing it into engagement with the bottom of the panel, the lug on the shoe preventing its sliding past without carrying with it the panel. When the shoe reaches the other end of the track it drops off and the lug is thus disengaged from the panel. In order, however, that the panels may be held in appropriate display position, that is, in a position substantially parallel with the front of the case the shoe is provided with the rearwardly extending horn or lug which lifts up the next panel and carries it to the end of the track leaving it against the track. This cycle continues as long as the motor is operated, the panels being one at a time lifted from the plate or disk carried along on the track through an angle of 180 degrees and then dropped on the plate thus exposing first one side and then the other of each successive panel. The panels are illuminated in the usual manner by the electric lights which are located in the top of the case in such manner that they shine directly on the panels but not in the eyes of the spectator. Display cards are held in the panels or frames by placing them within the grooves on the inner sides thereof. The panels may be divided into appropriate spaces by means of the slidable strips which are provided with tongues or lugs engaging the grooves.

I claim:—

1. The combination with a plurality of panels radially arranged of means for rotating successive panels, and means for simultaneously moving forward the next succeeding panel to take the place of the one which is being rotated, said means operative at the beginning of the movement of the rotating panel.

2. The combination with a plurality of panels radially arranged of means for rotating successive panels, a means for simultaneously moving forward the next succeeding panel to take the place of the one which is being rotated, said means comprising a rotating panel engaging shoe.

3. In an advertising device a plurality of radially arranged panels, a supporting means therefor and a shaft about which they rotate, a means for holding them in position comprising a track raised above the supporting means.

4. In an advertising device comprising a casing of vertically disposed shaft therein, a disk concentric with said casing, an L-shaped track concentric therewith projecting thereabove and slightly removed therefrom, a downwardly inclined projection from said track, panels rotatably mounted about said shaft and supported upon said disk, a sleeve rotatably mounted upon said shaft below said disk, an arm carried by said sleeve and terminating in a carriage projecting upwardly between said disk and said track and adapted to travel upon said track during a portion of its revolution, a panel contacting surface upon said carriage, a panel engaging lug projecting above said surface and a rearwardly and upwardly inclined lug projecting from the rear of said shoe.

June 8th 1911.

ELMER FLETCHER.

Witnesses:
FRANCIS W. PARKER, Jr.,
SOPHIE B. WEINY.

Copies of this patent may be obtained for five cents each, by addressing the "Commissioner of Patents, Washington, D. C."